United States Patent [19]
Meiller et al.

[11] Patent Number: 5,188,423
[45] Date of Patent: Feb. 23, 1993

[54] ARMREST ARRANGEMENT FOR A SEAT

[75] Inventors: Hermann Meiller, Amberg; Walter Mertel, Sulzbach-Rosenberg, both of Fed. Rep. of Germany

[73] Assignee: Grammer AG, Amberg, Fed. Rep. of Germany

[21] Appl. No.: 748,539

[22] Filed: Aug. 22, 1991

[30] Foreign Application Priority Data

Dec. 28, 1990 [DE] Fed. Rep. of Germany ....... 4042105

[51] Int. Cl.[5] ................................................ A47C 7/54
[52] U.S. Cl. ................................... 297/412; 297/417
[58] Field of Search .............. 297/411, 412, 417, 115, 297/359

[56] References Cited

U.S. PATENT DOCUMENTS

| | | | |
|---|---|---|---|
| 2,561,091 | 7/1951 | Bell | 297/411 |
| 4,496,190 | 1/1985 | Barley | 297/411 |
| 4,984,847 | 1/1991 | Bedu et al. | 297/411 |

FOREIGN PATENT DOCUMENTS 1256977  12/1971  United Kingdom ................ 297/417

*Primary Examiner*—Kenneth J. Dorner
*Assistant Examiner*—James M. Gardner
*Attorney, Agent, or Firm*—Elliot M. Olstein; Raymond J. Lillie

[57] ABSTRACT

An armrest arrangement for a seat comprises an armrest support pivotably supporting an armrest, with an adjusting and retaining assembly operatively disposed between the armrest and its support for parallel displacement of the armrest in respect of height, in any angular position of the support. The armrest support rotatably carries three gears which are in meshing engagement with each other, the first thereof being rotatably disposed at the mounting axis at which the armrest is connected to the armrest support. The support has a plurality of openings disposed at spacings from each other along an arcuate path which is concentric with respect to said mounting axis and the adjusting and retaining assembly comprises a retaining lever which is carried on said first gear and which is displaceable between a release position in which it only extends into an aperture in the first gear and an arresting position in which it extends through the aperture in the first gear and into a respective ones of the openings in the armrest support thereby to fix the first gear to the armrest support.

6 Claims, 3 Drawing Sheets

ARMREST ARRANGEMENT FOR A SEAT

BACKGROUND OF THE INVENTION

The demand for improved levels of comfort in seats, for example and more especially vehicle seats, has resulted in the development of seats including armrests which may be adjustable in various ways. For example U.S. Pat. No. 4,828,323 discloses an armrest arrangement for a seat comprising an armrest which is pivotably connected by means of a first mounting axis to an armrest support which in turn is mounted pivotably to the seat by means of a second mounting axis which is disposed at a spacing from and parallel to the first mounting axis. Provided between the armrest and the armrest support is an adjusting and retaining means for parallel adjustment in respect of height of the armrest in any possible angular position of the armrest support and for upward pivotal movement of the armrest in relation to its support. In that design configuration the adjusting and retaining means has a disc member which is provided on the first mounting axis for guiding a pulling cable therearound and for fixing a spring element, as well as a ratchet wheel which is disposed at the second mounting axis and to which the cable is fixed by means of one of its end portions. A locking pawl is also pivotably mounted on the armrest support and is designed to come into engagement with the ratchet wheel. The spring element which is secured to the disc member at the first mounting axis is suitably connected to the pawl. However that armrest arrangement suffers from the disadvantage that, in particular after a prolonged period of use thereof, it is not possible reliably to guarantee that the cable will not suffer breakage, which would result in the armrest arrangement becoming totally inoperative.

SUMMARY OF THE INVENTION

An object of the present invention is to provide an adjustable armrest arrangement for a seat, which still operates reliably even after a prolonged period of use.

Another object of the present invention is to provide an adjustable seat armrest arrangement which is designed to operate on sound mechanical principles such as to afford versatility of adjustment and a long service life.

Still another object of the present invention is to provide an armrest arrangement for a seat, which provides easy and reliable adjustment in a versatile fashion without requiring the application of a substantial amount of force for adjustment purposes.

Still a further object of the present invention is to provide an adjustable armrest arrangement in which adjustment thereof does not require a multiplicity of complicated adjustment manipulations.

In accordance with the principles of the present invention, the foregoing and other objects are achieved by an armrest arrangement for a seat such as a vehicle seat comprising an armrest which is pivotably connected at a first mounting axis to an armrest support means. The armrest support means is adapted to be pivotably mounted to the respective seat by means of a second mounting axis which is remote from and parallel to the first mounting axis, and the armrest arrangement includes between the armrest and the armrest support means an adjusting and retaining assembly for parallel adjustment in respect of height of the armrest in any angular position of the armrest support means and also to provide for upward pivotal movement of the armrest in relation to the armrest support means. The armrest arrangement further includes first, second and third gears which are rotatably mounted in the armrest support means, the first gear being disposed at the first mounting axis and having an aperture therethrough, the second gear being disposed at the second mounting axis and the third gear being disposed between the first and second gears and being in meshing engagement therewith. The adjusting and retaining assembly comprises a retaining lever disposed on the first gear displaceably between a release position and an arresting position of fixing the first gear relative to the armrest support, the retaining lever having a retaining portion which in the release position of the retaining lever projects only into the aperture in the first gear while in the arresting position of the lever extends through the aperture in the first gear into one of a plurality of openings disposed at spacings from each other along an arc which is concentric with respect to the first mounting axis.

As will be seen in greater detail hereinafter, that configuration of the armrest arrangement in accordance with the invention affords the advantage that the meshing operative connection between the first, second and third gears is guaranteed after a prolonged period of operation of the armrest arrangement, in precisely the same fashion as when the armrest arrangement is in the new, unused condition. The arrangement of the invention also affords the advantage that the adjusting and retaining assembly of the unit can be actuated by the application of a small amount of force at any time in order to adjust the armrest as desired in respect of height and at the same time in parallel relationship. If necessary it is possible for the armrest to be pivoted upwardly relative to the armrest support. That is possible in particular when the armrest support occupies an upstanding position in which the armrest support is directed at least approximately in the same direction as the backrest of the seat such as a vehicle seat to which the armrest arrangement is fitted. It is then readily possible for a seat occupant to sit in or leave the seat without such movement being unacceptably impeded by the presence of the armrest.

In accordance with a preferred feature of the invention at least the first and second gears are of the same size because in that case the armrest is adjusted in respect of height in precisely parallel relationship in any angular position of the armrest support. The third gear which is mounted on the armrest support between the first and second gears may be of the same size as the first and second gears, but it is also possible for the third gear to be for example smaller than the first and second gears in order for the armrest support to be of a relatively short length.

In a preferred feature the retaining lever is fixed to the first gear by means of a spring element and is mechanically biased in the arresting position, the spring stress being increased in the release position of the retaining lever. That reliably prevents the retaining lever from assuming an indefinite position in which it would no longer be suitably fixed in relation to the first gear.

In a preferred feature of the invention, which provides a simple design configuration, the retaining lever is of a two-arm configuration. The retaining portion is provided on one lever arm while the second lever arm has a contact or bearing portion. The adjusting and retaining assembly has a pin which can be brought to bear against the bearing portion of the retaining lever, the pin being mounted on the armrest and being adapted to be actuated from outside same by means of an actuating element. In a preferred aspect of that arrangement, the pin is provided with a portion having abutments, which portion can be brought to bear against the bearing portion of the retaining lever. That portion on the pin may be a groove which extends around the pin and the two side surfaces of which form the abutments which are adapted to come into contact with the bearing portion on the retaining lever.

A preferred feature of the invention provides an armrest which can be displaced and adjusted in respect of inclination, relative to the armrest support, in a simple manner without the application of a large amount of force, wherein the pin has a screwthread portion with which the pin is screwed through a screwthreaded sleeve or bush which is oriented parallel to the first mounting axis and which is mounted rotatably on the armrest. Secured to the first mounting axis is an abutment element which projects radially away from the first mounting axis and against which the pin bears with its end portion remote from the above-mentioned actuating element, for adjusting the inclination of the armrest. When the pin is screwed through the screwthreaded sleeve or bush to a greater or lesser degree, the armrest is then pivoted to a greater or lesser degree about the first mounting axis relative to the armrest support, thereby setting the angle of inclination of the armrest as desired.

Further objects, features and advantages of the present invention will be apparent from the following description of a preferred embodiment thereof.

DESCRIPTION OF THE PREFERRED EMBODIMENT

Figure 1:
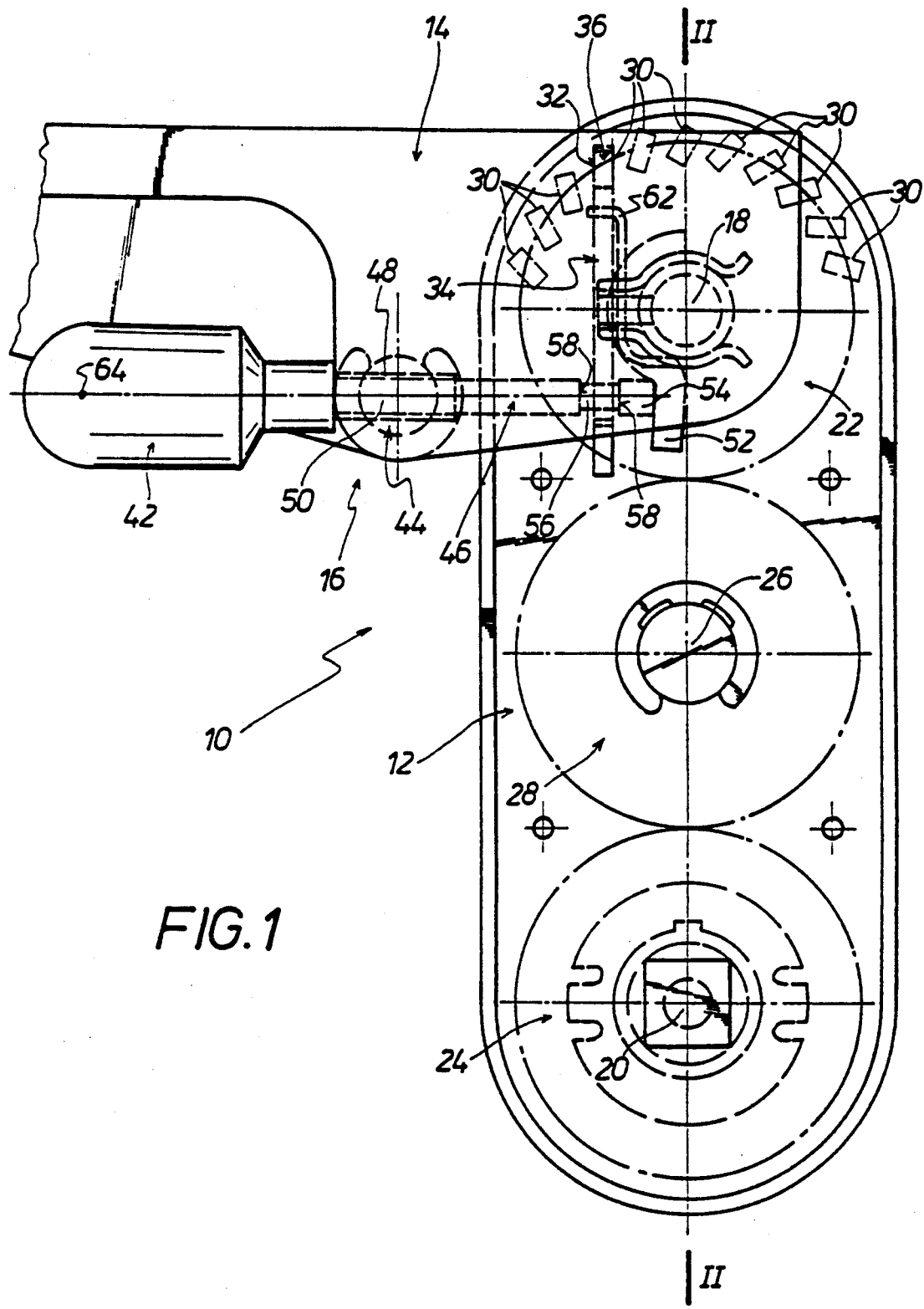
FIG. 1 is a side view of the armrest arrangement in accordance with the principles of the present invention, with only part of the armrest being shown.

It will be noted at this point that the upholstery on the armrest arrangement according to the invention is not shown in the drawing, for the sake of simplicity.

Figure 2:
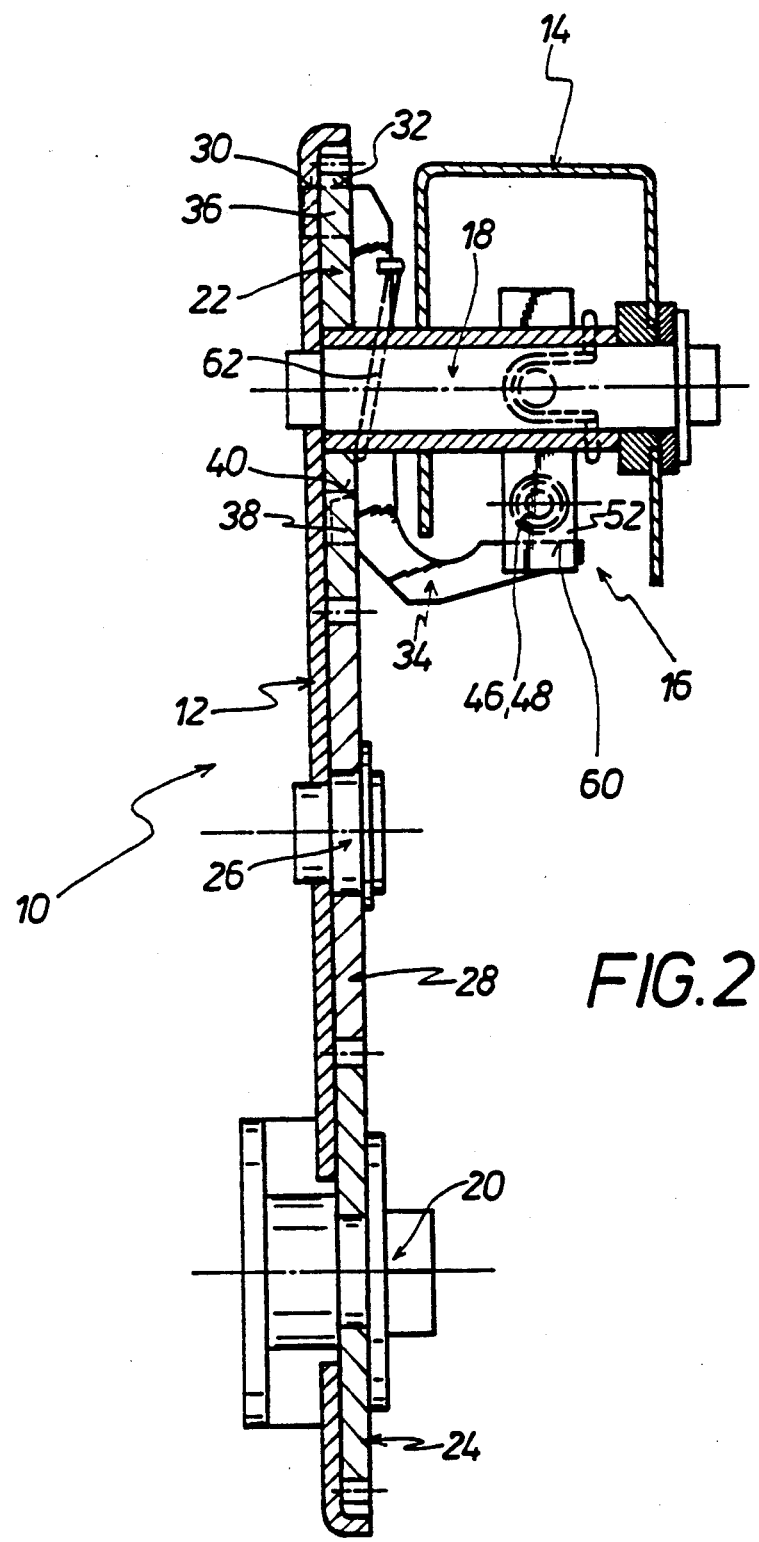
FIG. 2 is a view in section taken along line II—II in FIG. 1.

Referring firstly to FIGS. 1 and 2, shown therein is an armrest arrangement 10 according to the invention comprising an armrest support 12 and an armrest 14, together with an adjusting and retaining assembly 16 which is operatively disposed between the armrest 14 and the armrest support 12. The armrest 14 is pivotably connected to the armrest support 12 by means of a first mounting axis as generally indicated at 18, comprising for example a shaft, spindle, trunnion or the like. The armrest support 12 is in turn pivotably mounted to a seat (not shown) by means of a second mounting axis as indicated at 20.

A first gear 22 is rotatably mounted at the first mounting axis 18 and a second gear 24 is rotatably mounted at the second mounting axis 20. The first and second gears 22 and 24 are of the same size and have the same tooth configurations.

A third gear 28 is rotatably mounted on a mounting trunnion 26 on the armrest support 12 between the first and second gears 22 and 24. The third gear 28 has the same tooth configuration as the first and second gears 22 and 247 and is in meshing engagement therewith.

The armrest support 12 is provided with a plurality of openings as at 30 disposed at equal spacings from each other along a circular arc which is concentric with the first mounting axis 18. The first gear 22 which is rotatably mounted at the first mounting axis 18 has an aperture 32, the transverse dimension of which corresponds to the transverse dimension of each individual opening 30 and the wall thickness of a retaining lever 34 or a retaining portion 36 of the retaining lever 34. The retaining lever 34 with its retaining portion 36 can be clearly seen from the side in FIG. 2.

Referring therefore now more specifically to FIG. 2, it can be clearly seen therefrom that the retaining lever 34 is in the form of a two-arm lever which is mounted by a mounting portion indicated at 38 in a hole 40 in the first gear 22 and is displaceable about that mounting location between an arresting position and a release position. In the arresting position of the retaining lever 34 the retaining portion 36 thereof projects through the aperture 32 in the first gear 22 into a respective one of the openings 30 in the armrest support 12, whereby the first gear 22 is fixed with respect to the armrest support 12. It will also be seen from FIG. 2 that the retaining portion 36 of the retaining lever 34 can be moved towards the right in FIG. 2 in order thereby for the retaining lever 34 to move into its release position in which the retaining portion 36 thereof is moved out of the corresponding opening 30 in the armrest support 12 and then only still projects into the aperture 32 in the first gear 22.

Figure 3:
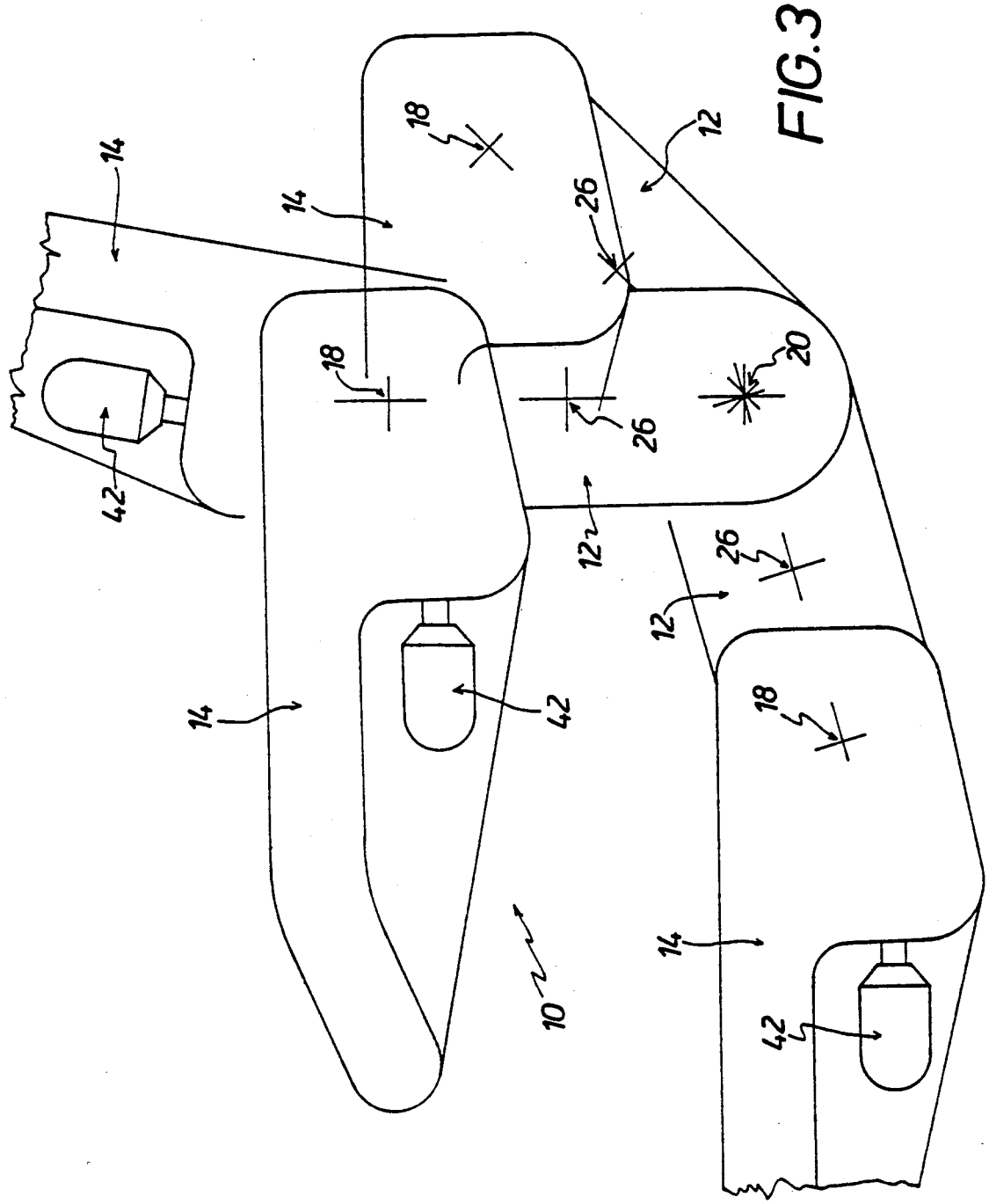
FIG. 3 is a side view similar to that shown in FIG. 1 of the armrest arrangement in different positions.

The retaining lever 34 occupies its release position as referred to above when an actuating element indicated at 42 in FIGS. 1 and 3 is suitably actuated, by being pulled upwardly towards the armrest 14 in FIG. 1. The actuating element 42 is connected to a pin 46 having thereon a screwthreaded portion 48. The pin 46 is screwed by means of the screwthreaded portion 48 through a screwthreaded bush or sleeve 50 which defines a mounting axis 44.

Looking still at FIG. 1, projecting radially away from the first mounting axis 18 is an abutment element 52 against which the pin 46 bears by way of its end portion 54 which is remote from the end of the pin 46 on which the actuating element 42 is disposed. The pin 46 is also provided with a portion 56 which is defined and delimited by first and second abutments as indicated at 58 and formed for example by the side surfaces of a peripheral groove in the pin 46. The portion 56 of the pin 46 is intended to come to bear against a contact or bearing portion indicated at 60 in FIG. 2 of the retaining lever 34.

A spring element indicated at 62 in both FIGS. 1 and 2 is disposed between the first mounting axis 18 and the retaining lever 34 in such a way that in the normal rest condition of the assembly the retaining lever 34 occupies its arresting position in which, as already stated above, the retaining portion 36 of the retaining lever 34 projects through the aperture 32 in the first gear 22 into one of the openings 30 in the armrest support 12. In that condition the spring element 62 is subjected to a mechanical biasing effect. That biasing of the spring element 62 is further increased when the retaining lever 34 is pivoted from the arresting position into the releaase position thereof; that is effected by actuation of the actuating element 42 as described above, that is to say by pivotal movement of the actuating element 42 about the mounting axis 44, relative to the armrest 14. At the same time one of the abutments 58 on the pin 46 comes to bear against the portion 60 of the retaining lever 34 so that in that operating condition of the assembly it is no longer possible to pivot the armrest 14 alone, that is to say without simultaneous pivotal movement of the armrest support 12. Pivotal movement of the armrest 14 on its own is possible only when the pin 46 or its portion 56 does not bear against the portion 60 of the retaining lever 34.

Adjustment of the armrest 14 in respect of angle of inclination thereof, in relation to the virtually fixed armrest support 12, is possible by virtue of the actuating element 42 being turned about its longitudinal axis as indicated at 64 in FIG. 1, so that the screwthreaded portion 48 of the pin 46 which is rigidly connected to the actuating element 42 thereon is screwed through the screwthreaded bush or sleeve 50 to a greater or lesser degree. When that happens, the end portion 54 of the pin 46 is forced against the abutment element 52 so that the armrest 14 pivots to a greater or lesser degree about the first mounting axis 18, whereby the angle of inclination of the armrest 14 is adjusted as desired. The screwthreaded sleeve or bush 50 through which the pin 46 is screwed is oriented at least substantially parallel to the first mounting axis 18 and is suitably mounted rotatably on the armrest 14.

Referring now to FIG. 3, shown therein is a side view of the armrest arrangement 10 with the armrest 14 in a lower position, in a position of maximum height and in a position in which the armrest support 12 is pivoted rearwardly. FIG. 3 also shows the armrest arrangement in a position of the armrest support 12 in which the armrest support 12 is disposed at least approximately perpendicularly, with the armrest 14 in its highest position, and the armrest 14 is pivoted upwardly to extend in the direction of the backrest (not shown) of a seat.

FIG. 3 also clearly shows that, in any desired angular position of the armrest support 12, the armrest 14 remains in respective parallel relationship, that is to say substantially horizontally, about the second mounting axis 20, a corresponding adjustment in respect of the height of the armrest 14 occurring simultaneously with the pivotal movement of the armrest support 12.

It will be readily appreciated from FIG. 3 that when the armrest 14 is in the upwardly pivoted position, by pivotal movement about the first mounting axis 18, relative to the armrest support 12 which in that situation is also disposed vertically, it is readily possible to move into or leave the seat (not shown) on which the armrest arrangement 10 is provided.

It will further be appreciated that the above-described construction and mode of operation have been set forth solely by way of example and illustration of the present invention and that various modifications and alterations may be made therein without thereby departing from the spirit and scope of the invention.

What is claimed is:

1. An armrest arrangement for a seat comprising an armrest support means, an armrest pivotably connected at a first mounting axis to the armrest support means, the armrest support means having a plurality of openings disposed at spacings from each other along an arc which is concentric with said first mounting axis, means for pivotably mounting the armrest support means to a said seat at a second mounting axis which is spaced from and parallel to said first mounting axis, first, second and third gears rotatably mounted on the armrest support means, the first gear being disposed at said first mounting axis and having an aperture therethrough, the second gear being disposed at said second mounting axis and the third gear being disposed between the first and second gears and meshing therewith, and an adjusting and retaining means operatively disposed between the armrest and the armrest support means for parallel adjustment in respect of height of the armrest in any angular position of the armrest support means and for pivotal movement of the armrest in relation to the armrest support means, the adjusting and retaining means comprising a retaining lever disposed on the first gear displaceably between an arresting position of fixing the first gear relative to the armrest support means and a release position, the retaining lever having a retaining portion which in said release position projects only into said aperture in the first gear while in said arresting position said retaining portion extends through said aperture in said first gear into a respective one of said openings in the armrest support means.

2. An arrangement as set forth in claim 1 wherein at least the first and second gears are of the same size.

3. An arrangement as set forth in claim 1 including a spring means adapted to mount said retaining lever to said first gear and biasing said retaining lever towards said arresting position, the spring stress being increased in the release position of said retaining lever.

4. An arrangement as set forth in claim 1 wherein said retaining lever has first and second arm portions, wherein the retaining portion is provided on the first arm portion and the second arm portion provides a bearing portion, wherein said adjusting and retaining means comprises a pin adapted to bear against said bearing portion of said retaining lever, and further including means mounting said pin on said armrest and actuating means operable to actuate said pin from outside the armrest.

5. An arrangement as set forth in claim 4 wherein said pin comprises a portion providing abutment means, which portion is adapted to bear against said bearing portion on said retaining lever.

6. An arrangement as set forth in claim 4 and further including a screwthreaded sleeve means which is directed at least substantially parallel to said first mounting axis and which is mounted rotatably on said armrest, wherein said pin has a screwthreaded portion with which it is screwed through said screwthreaded sleeve means, and further including an abutment element disposed at said first mounting axis and projecting at least substantially radially away from same, said pin being adapted to bear against said abutment element thereby to adjust the inclination of said armrest by virtue of said pin being screwed in said screwthreaded sleeve means.

* * * * *